(12) United States Patent
Grant

(10) Patent No.: US 12,261,952 B2
(45) Date of Patent: Mar. 25, 2025

(54) MULTIPLE VECTOR ONE-TIME KEY PAD

(71) Applicant: Crown Sterling Limited, LLC, Newport Beach, CA (US)

(72) Inventor: Robert Edward Grant, Laguna Beach, CA (US)

(73) Assignee: Crown Sterling Limited, LLC, Newport Beach, CA (US)

( * ) Notice: Subject to any disclaimer, the term of this patent is extended or adjusted under 35 U.S.C. 154(b) by 288 days.

(21) Appl. No.: 17/981,051

(22) Filed: Nov. 4, 2022

(65) Prior Publication Data

US 2024/0154796 A1    May 9, 2024

(51) Int. Cl.
  *H04L 29/00* (2006.01)
  *H04L 9/08* (2006.01)

(52) U.S. Cl.
  CPC .................. *H04L 9/0869* (2013.01)

(58) Field of Classification Search
  CPC ..... H04L 9/0869; H04L 9/0668; H04L 9/001; H04L 2209/26
  See application file for complete search history.

(56) References Cited

U.S. PATENT DOCUMENTS

| | | |
|---|---|---|
| 4,166,405 A | 9/1979 | Hiyoshi et al. |
| 4,613,901 A * | 9/1986 | Gilhousen ............ H04N 7/1675 380/240 |
| 4,860,624 A | 8/1989 | Dinnan et al. |
| 4,868,624 A | 9/1989 | Grung et al. |
| 5,033,352 A | 7/1991 | Kellogg |
| 5,516,981 A | 5/1996 | Nagai |
| 5,764,772 A | 6/1998 | Kaufman |
| 5,966,445 A | 10/1999 | Park |
| 5,987,483 A | 11/1999 | Edelkind et al. |
| 6,072,876 A | 6/2000 | Obata |
| 6,154,541 A | 11/2000 | Zhang |
| 6,154,542 A | 11/2000 | Crandall |
| 6,349,319 B1 | 2/2002 | Shankar et al. |
| 6,396,928 B1 | 5/2002 | Zheng |
| 6,448,487 B1 | 9/2002 | Smith |
| 6,480,605 B1 | 11/2002 | Uchiyama |
| 6,636,968 B1 | 10/2003 | Rosner |
| 6,751,736 B1 | 6/2004 | Bowman |

(Continued)

FOREIGN PATENT DOCUMENTS

| | | |
|---|---|---|
| DE | 102018005247 A1 | 1/2020 |
| EP | 1220174 A1 | 12/2000 |

(Continued)

OTHER PUBLICATIONS

Bhaumik, et al. "Safely Doubling your Block Ciphers for a Post-Quantum World," Inria, Paris. 2020. 49 pages.

(Continued)

*Primary Examiner* — Don G Zhao
(74) *Attorney, Agent, or Firm* — Fish IP Law, LLP; Tomas A. Prieto

(57) ABSTRACT

A system and method of securely generating encryption keys that includes a computing device obtaining a seed and applying a first function to the seed to derive a first sequence of digits. A second function is then used to obtain a second sequence of digits from the first sequence of digits at a predetermined start position. The encryption key is derived from the resulting second sequence of digits.

10 Claims, 2 Drawing Sheets

(56) References Cited

U.S. PATENT DOCUMENTS

| | | |
|---|---|---|
| 6,763,364 B1 | 7/2004 | Wilber |
| 6,778,666 B1 | 8/2004 | Kuzmich et al. |
| 6,924,426 B2 | 8/2005 | Clynes |
| 6,990,200 B1 | 1/2006 | Kasahara |
| 7,062,044 B1 | 1/2006 | Solinas |
| 7,502,754 B2 | 3/2009 | Campbell |
| 8,468,244 B2 | 6/2013 | Redlich |
| 8,516,244 B2 | 8/2013 | Waters |
| 8,885,820 B1 | 11/2014 | Lambert et al. |
| 9,325,499 B1* | 4/2016 | Juels ................ H04L 9/0861 |
| 9,425,954 B1 | 8/2016 | Chalker |
| 9,450,749 B2 | 9/2016 | Hammersmith |
| 9,674,162 B1 | 6/2017 | Miller et al. |
| 9,917,699 B2 | 3/2018 | Booth et al. |
| 10,230,703 B1 | 3/2019 | Lepore |
| 10,476,665 B1 | 11/2019 | Griffin et al. |
| 10,911,451 B2 | 2/2021 | Costa |
| 10,936,744 B1* | 3/2021 | Trepetin ............ H04L 63/0421 |
| 11,042,653 B2 | 6/2021 | Haager et al. |
| 11,080,665 B1 | 8/2021 | Poelstra et al. |
| 11,139,955 B1 | 10/2021 | So et al. |
| 11,188,977 B2 | 11/2021 | Youb |
| 11,233,636 B1 | 1/2022 | Peddada et al. |
| 11,258,617 B1 | 2/2022 | Peddada et al. |
| 11,279,164 B1 | 3/2022 | Hsu et al. |
| 11,310,042 B2 | 4/2022 | Grant |
| 11,443,310 B2 | 9/2022 | Bolla |
| 11,522,700 B1 | 12/2022 | Auerbach et al. |
| 11,532,293 B2 | 12/2022 | Beasley |
| 11,533,173 B2 | 12/2022 | McElveen |
| 11,552,780 B2* | 1/2023 | Grant ................ H04L 9/0861 |
| 12,045,364 B1* | 7/2024 | Trepetin ............ H04L 63/0428 |
| 2001/0012365 A1* | 8/2001 | Gaedke ............... H04N 19/60 375/E7.231 |
| 2001/0048670 A1* | 12/2001 | Kelly ................. H01Q 1/1257 370/468 |
| 2002/0000931 A1* | 1/2002 | Petronic ............. H04B 7/2125 342/359 |
| 2002/0004369 A1* | 1/2002 | Kelly ................. H04B 7/2125 455/12.1 |
| 2002/0009058 A1* | 1/2002 | Kelly ................ H04B 7/18597 370/316 |
| 2002/0154769 A1* | 10/2002 | Petersen ............... G06F 7/586 380/42 |
| 2003/0016823 A1 | 1/2003 | Chung |
| 2003/0050015 A1* | 3/2003 | Kelly ................ H04B 7/18519 455/67.14 |
| 2003/0058810 A1* | 3/2003 | Petronic ............. H04L 12/2801 370/395.2 |
| 2003/0081785 A1 | 5/2003 | Boneh |
| 2003/0112878 A1* | 6/2003 | Kloper ............... H04B 7/18547 375/259 |
| 2003/0112972 A1 | 6/2003 | Hattick et al. |
| 2003/0115449 A1 | 6/2003 | Yochim |
| 2004/0052367 A1* | 3/2004 | Yang .................. H04L 9/065 380/28 |
| 2004/0086117 A1* | 5/2004 | Petersen ............. H04L 9/0668 380/44 |
| 2004/0096056 A1 | 5/2004 | Boren |
| 2004/0200335 A1 | 10/2004 | Phillips |
| 2005/0271207 A1 | 12/2005 | Frey |
| 2006/0045262 A1 | 3/2006 | Oralndo |
| 2006/0072745 A1 | 4/2006 | Fukaya |
| 2006/0177065 A1 | 8/2006 | Halbert |
| 2006/0262957 A1 | 11/2006 | Asano |
| 2007/0064930 A1 | 5/2007 | Fischer |
| 2007/0211893 A1 | 9/2007 | Frosik |
| 2007/0283161 A1* | 12/2007 | Yami .................. H04L 9/3226 713/183 |
| 2008/0107274 A1 | 5/2008 | Worthy |
| 2008/0006140 A1 | 6/2008 | Adams |
| 2008/0130873 A1 | 6/2008 | Bolotov et al. |
| 2008/0184872 A1 | 8/2008 | Hunt et al. |
| 2008/0208560 A1 | 8/2008 | Johnson |
| 2008/0257136 A1 | 10/2008 | Meeks |
| 2009/0146851 A1 | 1/2009 | Lablans |
| 2009/0094464 A1 | 4/2009 | Futa et al. |
| 2009/0207999 A1 | 8/2009 | Yonemura et al. |
| 2009/0216910 A1 | 8/2009 | Duchesneau |
| 2010/0119061 A1 | 5/2010 | Kawale |
| 2012/0134495 A1 | 5/2012 | Liu |
| 2012/0213358 A1 | 8/2012 | Dror et al. |
| 2013/0142323 A1* | 6/2013 | Chiarella ................ G06F 7/58 380/28 |
| 2013/0297937 A1 | 11/2013 | Fransen |
| 2013/0315388 A1 | 11/2013 | Chiarella |
| 2014/0036492 A1 | 2/2014 | Simon et al. |
| 2014/0112469 A1 | 4/2014 | Layne |
| 2014/0112473 A1* | 4/2014 | Gassi ................... H04L 9/06 380/255 |
| 2015/0227747 A1* | 8/2015 | Gassi .................. G06F 21/602 713/193 |
| 2015/0363607 A1* | 12/2015 | Yang .................. H04L 9/085 713/165 |
| 2016/0012252 A1 | 1/2016 | Deleeuw |
| 2016/0014110 A1 | 1/2016 | Kurspahic |
| 2016/0042657 A1 | 2/2016 | Granger et al. |
| 2016/0323736 A1 | 11/2016 | Donahue et al. |
| 2017/0078087 A1 | 3/2017 | Chalker |
| 2017/0085367 A1* | 3/2017 | Fernández .............. G06F 1/04 |
| 2017/0222804 A1 | 8/2017 | Dewitt |
| 2017/0302446 A1 | 10/2017 | Thorwirth |
| 2017/0310650 A1 | 10/2017 | McMullen |
| 2017/0315212 A1 | 11/2017 | Monferrer |
| 2018/0039667 A1 | 2/2018 | Pierce et al. |
| 2018/0101322 A1 | 4/2018 | Cheriton |
| 2018/0131526 A1 | 5/2018 | Ellingson |
| 2018/0241548 A1 | 8/2018 | Dolev et al. |
| 2018/0332010 A1 | 11/2018 | Graber et al. |
| 2019/0036678 A1 | 1/2019 | Ahmed |
| 2019/0051276 A1 | 2/2019 | Lathrop et al. |
| 2019/0089532 A1 | 3/2019 | Lambert |
| 2019/0120929 A1 | 4/2019 | Meadow |
| 2019/0173677 A1 | 6/2019 | Christmas et al. |
| 2019/0238323 A1 | 8/2019 | Bunch |
| 2020/0084024 A1 | 3/2020 | Myers |
| 2020/0084037 A1 | 3/2020 | Zhang |
| 2020/0136819 A1 | 4/2020 | Bae et al. |
| 2020/0153458 A1 | 5/2020 | Strobel et al. |
| 2020/0177579 A1 | 6/2020 | Allen |
| 2020/0228507 A1 | 7/2020 | Anderson et al. |
| 2020/0241841 A1 | 7/2020 | Tamiya |
| 2020/0293212 A1 | 9/2020 | Narayanamurthy |
| 2020/0366652 A1 | 11/2020 | Koyun |
| 2020/0396059 A1 | 12/2020 | Micali |
| 2021/0028935 A1 | 1/2021 | Wu et al. |
| 2021/0065664 A1 | 3/2021 | Ryyanen et al. |
| 2021/0311188 A1 | 10/2021 | Stuart et al. |
| 2021/0312055 A1 | 10/2021 | Kloth |
| 2021/0336766 A1 | 10/2021 | Kim et al. |
| 2021/0377000 A1* | 12/2021 | Bowen .............. H04N 21/6377 |
| 2021/0382695 A1 | 12/2021 | Chang et al. |
| 2022/0027920 A1 | 1/2022 | Sharma et al. |
| 2022/0085998 A1 | 3/2022 | Xiao et al. |
| 2022/0198034 A1 | 6/2022 | Rodriguez |
| 2022/0199058 A1 | 6/2022 | Grant |
| 2023/0007439 A1 | 1/2023 | Williams |
| 2023/0105309 A1* | 4/2023 | Davis ................ H04L 9/0894 713/176 |
| 2023/0163951 A1* | 5/2023 | Grant ................ H04L 9/0656 713/189 |
| 2023/0163952 A1* | 5/2023 | Grant ................ H04L 9/0662 380/28 |
| 2023/0163953 A1* | 5/2023 | Grant ................ H04L 9/0656 380/30 |
| 2024/0121606 A1* | 4/2024 | Zhou ................ H04L 9/3242 |

FOREIGN PATENT DOCUMENTS

| | | |
|---|---|---|
| EP | 1220174 | 7/2002 |
| EP | 2680488 | 8/2019 |
| FR | 2679365 A1 | 1/1993 |

(56) References Cited

FOREIGN PATENT DOCUMENTS

| | | | |
|---|---|---|---|
| JP | 2002529774 A | 9/2002 | |
| JP | 2007157288 | 6/2007 | |
| JP | 2007157288 A | 6/2007 | |
| JP | 2007336556 A | 12/2007 | |
| JP | 2014026213 A | 2/2014 | |
| JP | 2019526201 A | 9/2019 | |
| KR | 20010008976 A | 2/2001 | |
| KR | 20130051386 A | 5/2013 | |
| KR | 101605496 B1 | 3/2016 | |
| WO | 199720306 A1 | 6/1996 | |
| WO | 0065768 | 11/2000 | |
| WO | 2000065768 A1 | 11/2000 | |
| WO | 2005085992 | 9/2005 | |
| WO | 2005085992 A1 | 9/2005 | |
| WO | 2010111320 A2 | 9/2010 | |
| WO | 2016135726 A1 | 9/2016 | |
| WO | 2016203762 | 12/2016 | |
| WO | 2016203762 A1 | 12/2016 | |
| WO | 2019110955 | 6/2019 | |
| WO | 2019110955 A1 | 6/2019 | |

OTHER PUBLICATIONS

Grant, Robert E. "Prime Number Pattern Discovery," Discoveries, Publications, Unified Math/Physics. Jul. 2018. 6 pages.
Grant, et al. "Reciprocal Wave Factorization," Strathspey Crown Holdings. Jun. 2020. 19 pages.
Barker, et al. "Recommendation for Pair-Wise Key Establishment Schemes Using Discrete Logarithm Cryptography," NIST. Apr. 2018. 2 pages.
Wang, et al. "A Decentralized Electricity Transaction Mode of Microgrid Based on Blockchain and Continuous Double Action," IEEE. 2018. 5 pages.
Wu, et al. "Forensic Analysis of Bitcoin Transactions," IEEE. 2019. 3 pages.
Burd, Barry. "A New Approach to Condensing Data Leads to a 99% Compression Rate," TechTarget. May 2015. 9 pages.
Zhang, et al. "A Blockchain-Based Authentication Method with One-Time Password," IEEE, 2019. 9 pages.
"Prime Number Pattern Discovery," Discoveries, Publications, Unified Math/Physics. Jul. 7, 2018, 6 pages.
International Search Report and Written Opinion for International Patent Application No. PCT/US2021/064739, dated Apr. 4, 2022, 14 pages.
International Search Report and Written Opinion for International Patent Application No. PCT/US2022/043866, dated Jan. 18, 2023, 9 pages.
Murat Kantarcioglu et al., "A Cryptographic Approach to Securely Share and Query Genomic Sequences", IEEE, Sep. 2008, 12 pages.
Luka Milinkovic et al., "Pseudo-Random Number Generator Based on Irrational Numbers", Telsiks, dated Oct. 8, 2011, 4 pages.
Ryutarou Ohbuchi et al., "Watermarking Three-Dimensional Polygonal Models", IBM Tokyo Research Laboratory, dated 1997, 12 pages.
Overarms, et al. "An Efficient Golden Ratio Method for Secure Cryptographic Applications", School of Engineering, Construction & Design, Melbourne Polytechnic, Preston, Australia. Sep. 17, 2018, 12 pages.
Kumar, et al. "A Symmetric Mecial Image Encryption Scheme Based on Irrational Numbers", Biomed Res 2018 Special Issue. S494-S498, 5 pages.
Bong-Ju Jang et al., "A New Digital Watermarking for Architectural Design Drawing using LINEs and ARCs Based on Vertex", Department of Electronic Computer Engineer, Pusan University of Foreign Studies, dated 2004, 14 pages.
International Search Report and Written Opinion for International Patent Application No. PCT/US2022/046045, dated Jan. 27, 2023, 11 pages.
Devika K. N. et al., "Parameterizable FPGA Implemetation of SHA-256 using Blockchain Concept", IEEE, dated Apr. 6, 2019, 5 pages.
Guangfu Wu et al, "The security and privacy of blockchain-enabled EMR storage management scheme", IEEE, dated 2020, 5 pages.
Wattana Viriyasitavat et al., "Blockchain Technology for Applications in Internet of Things-Mapping From System Design Perspective", IEEE, dated Oct. 2019, 14 pages.
Gabriela Ahmadi-Assalemi et al., "Federated Blockchain-based Tracking and Liability Attribution Framework for Employees and Cyber-Physical Objects in a Smart Workplace", IEEE, 9 pages.

\* cited by examiner

MULTIPLE VECTOR ONE-TIME KEY PAD

FIELD OF THE INVENTION

The field of the invention is encryption and data security.

BACKGROUND

The background description includes information that may be useful in understanding the present invention. It is not an admission that any of the information provided herein is prior art or relevant to the presently claimed invention, or that any publication specifically or implicitly referenced is prior art.

One-Time Pad ("OTP") cryptography is an encryption method that experts consider to be the gold standard of encryption. In order to execute One Time Pad correctly, the following conditions must be met:
1. The key is as long as the plaintext.
2. The key is random.
3. The key is never reused.
4. The key is secret.

One of the most difficult challenges that arises with One Time Pad encryption is providing a key that is truly random. Others have tried, but many use so-called "random" numbers that can theoretically be reproduced based on the natural rules of mathematics. As computing power grows and evolves, these theoretical limits become more likely of becoming practically achievable every passing day.

Thus, there is still a need for a better, more secure OTP solution.

SUMMARY OF THE INVENTION

The inventive subject matter provides apparatus, systems and methods in which a computing device generates an encryption key by deriving a first sequence of digits by applying a first function to a seed. The computing device generates a second sequence of digits by applying a second function to at least a portion of the first sequence of digits, beginning at a predetermined start position, and then deriving the encryption key from the second sequence of digits.

In embodiments of the inventive subject matter, the first function can be a root calculation of a number.

In embodiments, the seed can be a non-perfect square integer and the first sequence of digits is a mantissa derived from a square root of the seed.

In embodiments, the seed can be a number ending in 2, 3, 7 or 8.

In embodiments, the second function can be a mathematical function such as a multiplication, a division, an addition and a subtraction.

In embodiments, a computing device can securely encrypt multiple files by using different functions, indices, starting positions to generate separate encryption keys. The computing device can ensure the keys are sufficiently distinct by ensuring that the indices and/or starting positions are sufficiently numerically separate.

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms, is deemed to represent one or more computing devices having at least one processor (e.g., ASIC, FPGA, DSP, x86, ARM, ColdFire, GPU, multi-core processors, etc.) programmed to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
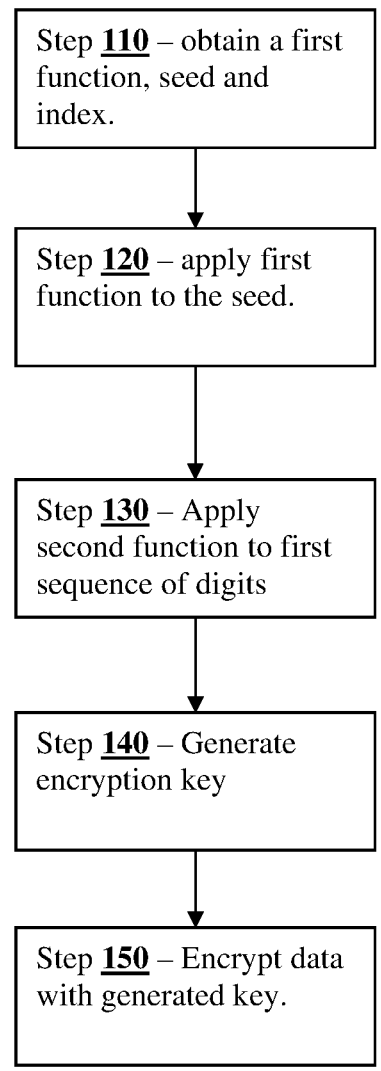
FIG. 1 is a flowchart of the process of generating secure encryption keys according to embodiments of the inventive subject matter.

FIG. 1 provides a flowchart of the process of generating secure encryption keys according to embodiments of the inventive subject matter.

At step 110, a computing device obtains a first function, a seed, and at least one index (which, as will be discussed below, corresponds to at least one start position).

When discussed herein, a computing device refers to any device having at least one processor, at least one non-transitory memory (RAM, ROM, etc.) and, optionally, at least one data-communication interface that enables the device to exchange data with other devices. Examples of suitable computing devices includes desktop computers, laptop computers, server computers, tablets, smartphones, gaming consoles, etc.

The functions, seeds, indices and/or other information discussed herein can be stored locally at the computer device in a database within the computing device's memory for retrieval or can be retrieved as needed by the computing device from a remote database stored at a remote computing device.

In embodiments, the first function can comprise a root function. In some embodiments, the first function will be a square root function.

In embodiments of the inventive subject matter, the seed comprises a non-perfect square integer and the first sequence of digits comprises a mantissa derived from the square root of the seed. In embodiments, the first sequence of digits comprises a portion of the mantissa.

For example, suppose that the computing device selects an integer I=9045373634724111364582183943721787334

In embodiments, the integer I can be generated from a random number generator. In other embodiments, the integer I can be generated a priori and then selected from a list or collection of generated integers. In these embodiments, the integer I to be used can change according to a schedule and/or discarded after use such that the computing device moves on to the next integer in the list.

In embodiment, the seed is a number that ends in 2, 3, 7 or 8. In embodiments of the inventive subject matter, the seed can be generated by appending a 2, 3, 7, or 8 at the end of a number such that the seed is a non-perfect square integer.

Then, the computing device converts this number to a non-perfect square number (NPSN) by appending a 2, 3, 7, or 8 at the end, resulting in a seed:

NPSN=90453736347241113645821839437217873342

At step 120, the computing device applies a first function to the seed to generate a first sequence of digits.

In the illustrative example shown here, the first function is considered to be calculating the square root of the NPSN and can include extracting the mantissa of the answer. Thus, the square root of the NPSN is computed to generate an irrational number (IN).

Thus, the IN=9510716920781582890.6624090553965129515075116369989360293 1 . . . .

The mantissa ("M") of the IN is extracted, which in this example:

M=0.66240905539651295150751163699893602931079 330053949056821 . . . .

The first sequence of digits is then generated by applying the first index or start position. For the purposes of this example, suppose the first index is 7. Thus, the first 7 digits of the mantissa M are removed (the digits 6624090 following the decimal point) and the first sequence then results:

$I_1=7$

M=0.55396512951507511636998936029310793300539 49056821 . . . .

$S_1=0.55396512951507511636998936029310793300539$ 490568215589216 . . . .

In embodiments of the inventive subject matter, the steps of step 120 can be performed a priori and stored in a file for later use. For example, the first sequence of digits $S_1$ that comprises the portion of the mantissa M can be stored in the file and retrieved by the computing device at a future time.

At step 130, the computing device applies a second function to at least a portion of the first sequence of digits at the start position, to generate a second sequence of digits. The second function can be obtained at step 130 or at the initial step 110.

In embodiments, the second function comprises a mathematical function that includes one or more of a multiplication, a division, an addition, and a subtraction.

In embodiments, the second function can be a mathematical function based upon a digital representation of at least a portion of an image. For example, second function can be a function to modify each bit in a sequence of the bit-converted digits of the mantissa by a sequence of rasterized bit in the image.

In embodiments, the second function can be a mathematical function based upon a digital representation of at least a portion of a piece of music. For example, the second function can be a function to modify each bit in a sequence of the bit-converted digits of the mantissa by a characteristic in a sequence of notes in the music. The modification can be based upon the tone (frequency) of the note, its length (¼, ⅛th, half, whole, etc.), or some characteristic of preceding to following notes (e.g., tempo).

Using a second index and a second function removes the result from the possible "natural" numbers set. In this example, the first sequence $S_1$ is multiplied by a second index $I_2$, which in this case is 9. Thus:

$I_2 * S_1 = 9 * 0.55396512951507511636998936029310793300539490568215589216\ldots$ In embodiments such as the example illustrated herein, the second index $I_2$ can also be used as a starting point for the second sequence of digits. This is shown below:

Z (the result of $I_2 * S_1$) = 4.985686165635676047329904242637971397048554151139403029506 . . . .

Applying the second index $I_2$ to eliminate the first 9 digits:
Z=6356760473299042426379713970485541511394030 29506 . . . .

Thus, the computing device derives the second sequence $S_2$ to be:
$S_2$=0.6356760473299042426379713970485541511394030295061272508176 . . . .

As discussed herein, the first and second functions are considered to be "non-null" functions in that they effect a transformation of some type. The first and second functions are not intended to include null functions that effectively "does nothing" to the data value to which it is applied.

At step 140, the computing device generates an encryption key from the second sequence of digits.

The encryption key can be the second sequence $S_2$ that is truncated to an appropriate length. As noted above, the encryption key must be as long as the plaintext, so the computing device truncates the second sequence $S_2$ to the length of the plaintext to be encrypted.

In embodiments, step 140 includes converting at least a portion of the second sequence of digits to a binary sequence.

At step 150, the computing device applies the generated encryption key to the data to encrypt it.

At a future time, the computing device generates the decryption key by repeating the steps 110-140 (using the same integer, function, and index values) and decrypts the data.

If the encrypted data is transmitted to a second computing device, the second computing device must be able to reproduce the steps 110-140 in order to generate the decryption key, so as to access the data. Thus, along with the transmission of the encrypted data, the computing device transmits to the second computing device additional information that the second computing device can use to generate the decryption key.

In these embodiments, it is understood that the second (receiving) computing device could have a priori knowledge of some of the secret information that the computing device already knows. For example, the second computing device could have a copy of the integer I and/or the list of integers along with the logic for selecting the integers (e.g., the schedule for selecting integers for use and/or the current integer).

In these embodiments, the additional information accompanying the encrypted data can include information necessary for the second computing device to select or derive the correct starting integer. For example, the additional information could include a timestamp that designates the time of encryption of the data. This timestamp would then be used by the second computing device to consult the schedule and determine the integer from the list that corresponded with the time on the timestamp. In another example, the additional information could include a pointer or indicator of the integer from the plurality of integers on the list (for situations where the integer is selected by the encrypting/sending computing device or other selection criteria is used).

In both of these examples, the astute reader will recognize that the exchange of this information is insufficient for an intercepting party to derive the integer because the integer is not derived from the timestamp or the pointer/indicator.

In some, less preferred embodiments, a single integer is used. In these cases, the second computing device could a priori have the integer stored or retrieve it from a third-party service.

In some embodiments, the first function will always be a square root function (along with extracting the mantissa of the resulting number). In these cases, no communication of any indicator of a function between the sending computing device and receiving computing device would be necessary.

In other embodiments, the first function can be a selection of a function among a plurality of available functions. As with the integer, the selection can be according to a schedule known to both the sending and receiving computing devices, or other selection process. In embodiments where the selection is according to a schedule, a timestamp of the time of encryption (which can be the same timestamp used for the integer) can be used by the receiving device to select the function. In other embodiments, a pointer or indicator that the receiving computing device uses to find the correct function among a plurality of functions can be included in the additional information.

If the receiving computing device does not have the correct function, it can obtain it securely from a third-party service.

It is contemplated that the second function can be selected and indicated to the receiving computing device in a similar manner.

In embodiments of the inventive subject matter, the additional information that accompanies the transmission of encrypted data can include an indicator of one or both of the indices. The indicator can be the value of the indicator (e.g., "7" and "9" from the above illustrative example) or a pointer to an index value in a database.

As discussed above, the key must be as long as the plaintext. Thus, the receiving computing device can determine the length of the key based on the received encrypted data. However, in embodiments, the additional information that accompanies the encrypted data can include an indicator of a key length. This indicator can enable the receiving computing device to check that the encrypted data hasn't been manipulated with or corrupted (either by deliberate action or error in transmission) during the transmission.

One of the principal tenets of a one-time pad is that each key is used only once, and then is discarded. This provides additional security to the users because if a third party were to somehow obtain or derive a decryption key for a particular encrypted data set, the key would only be useful against that specific encrypted data set. Other transmissions of encrypted data sets would not be affected. Thus, it is contemplated that each combination of information used to generate an encryption/decryption key (e.g., the combination of the initial integer, first and second function, and the indices), is only used once: for one encryption and then for decryption. After that, the encrypting computing device generates new keys for subsequent encryptions by changing one or more of the integer, the function(s) and/or the indices.

Figure 2:
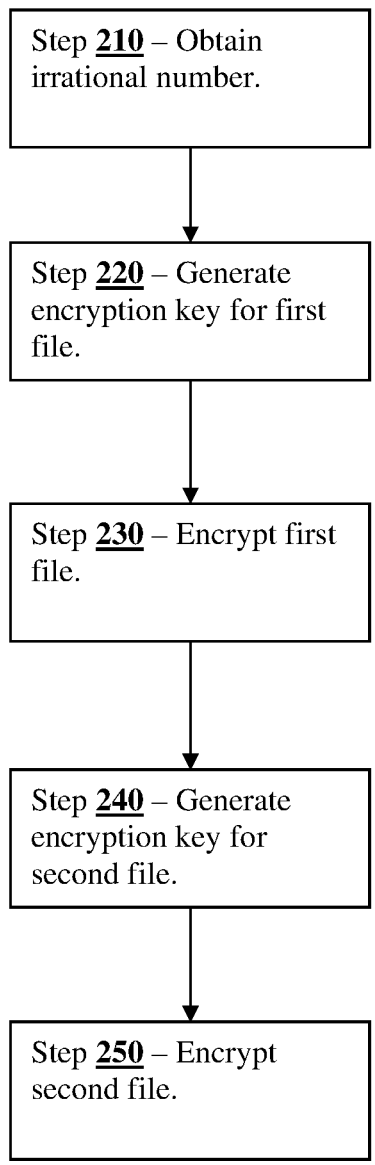
FIG. 2 shows a flowchart illustrating how multiple files can be securely encrypted using the systems and methods of the inventive subject matter.

FIG. 2 shows a flowchart illustrating how multiple files can be securely encrypted using the systems and methods of the inventive subject matter in such a way that computing resources used are reduced.

At step 210, a computing device obtains an irrational number to use as a base sequence. In embodiments, the irrational number can be generated by the computing device according to the processes of steps 110-120 of FIG. 1. In other embodiments, the irrational numbers can be a priori generated and stored for the computing device to later retrieve. In embodiments, the mantissa of the irrational number is extracted and used as the base sequence. Obtaining the mantissa of the irrational number is discussed above.

At step 220, the computing device generates an encryption key for a first one of multiple files by applying a first function that applies a first index against a first portion of the base sequence beginning at a first start position. Thus, the computing device selects a first start position that can be the same or different than the first index. The first start position corresponds to the digit of the mantissa from the decimal point denoted by the value of the first start position. Thus, a first start position of "8" corresponds to the 8$^{th}$ digit in the mantissa from the decimal point as the start of the first portion.

In embodiments, the first function comprises multiplying the first portion of the base sequence by the first index.

At step 230, the computing device encrypts the first file from the multiple files using the generated encryption key.

At step 240, the computing device generates an encryption key for a second one of multiple files by applying a second function that applies a second index against a second portion of the base sequence beginning at a second start position. As with the first start position, the second start position corresponds to the digit of the mantissa from the decimal point denoted by the value of the second start position. Thus, two separate portions of the same base sequence can be used to generate two distinct keys. This saves computing resources by requiring only a single base sequence and mantissa to be obtained and/or derived.

In embodiments, the second function comprises multiplying the second portion of the base sequence by the second index.

At step 250, the computing device encrypts the second file from the multiple files using the generated second encryption key.

The computing device ensures significant differences between the first and second encryption keys (the encryption keys for the first and second files) by ensuring there is at least one difference between the first and second start indices and the first and second positions. A difference between the first and second start indices could include a difference in value between the indices of at least 1, at least 5, at least 10, at least 100, etc. A difference between the first and second positions can include differences of at least one position, at least 5 positions, at least 10 positions, at least 100 positions, etc.

As with the embodiments of FIG. 1 above, in these embodiments the computing device saves the selections of the start positions, indices, and functions for later decryption. If one of the encrypted files is transmitted to a receiving computing device, the sending device can send indicators or pointers related to the start positions, indices, functions and the irrational number for that particular encrypted file such that the receiving device can look these up in a priori databases containing lists of potential start positions, indices, functions and irrational numbers. Thus, the sending device can granularly control who can access which files at which points.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of generating an encryption key, comprising:
obtaining, by a computing device, a first sequence of digits derived from application of a first function to a seed, wherein the seed is a non-perfect square integer, and the first sequence of digits comprises a mantissa derived from a square root of the seed;
obtaining, by the computing device, a second sequence of digits from application of a second function to at least a portion of the first sequence of digits, beginning at a predetermined start position;
deriving, by the computing device, the encryption key from the second sequence of digits; and
encrypting, by the computing device, data with the derived encryption key.

2. The method of claim 1, wherein the first function comprises a root.

3. The method of claim 1, further comprising selecting, by the computing device, the seed as a number ending in 2, 3, 7, or 8.

4. The method of claim 1, wherein the first sequence of digits comprises a portion of the mantissa.

5. The method of claim 4, wherein the step of obtaining the first sequence of digits comprises accessing, by the computing device, a previously stored file containing the portion of the mantissa.

6. The method of claim 4, wherein the second function comprises a mathematical function selected from the group consisting of a multiplication, a division, an addition, and a subtraction.

7. The method of claim 4, wherein the second function comprises a mathematical function based upon a digital representation of at least a portion of an image.

8. The method of claim 4, wherein the second function comprises a mathematical function based upon a digital representation of at least a portion of a piece of music.

9. The method of claim 4, wherein the step of deriving the encryption key comprises converting, by the computing device, at least a portion of the second sequence of digits to a binary sequence.

10. The method of claim 1, wherein the second function comprises multiplying, by the computing device, the portion of the first sequence of digits by an integer.

\* \* \* \* \*